US008235822B2

(12) United States Patent
Block

(10) Patent No.: US 8,235,822 B2
(45) Date of Patent: Aug. 7, 2012

(54) TRANSMITTING CONTENT IN WAGERING NETWORKS

(75) Inventor: Rory L. Block, Carson City, NV (US)

(73) Assignee: WMS Gaming Inc., Waukegan, IL (US)

( * ) Notice: Subject to any disclaimer, the term of this patent is extended or adjusted under 35 U.S.C. 154(b) by 947 days.

(21) Appl. No.: 12/093,149

(22) PCT Filed: Nov. 13, 2006

(86) PCT No.: PCT/US2006/044087

§ 371 (c)(1), (2), (4) Date: May 9, 2008

(87) PCT Pub. No.: WO2007/059080

PCT Pub. Date: May 24, 2007

(65) Prior Publication Data

US 2008/0235323 A1 Sep. 25, 2008

Related U.S. Application Data

(60) Provisional application No. 60/736,523, filed on Nov. 14, 2005.

(51) Int. Cl.
*A63F 13/00* (2006.01)

(52) U.S. Cl. ................ 463/43; 463/16; 463/17; 463/18; 463/19; 463/20; 463/22; 463/25; 463/29; 463/39; 463/40; 463/41; 463/42

(58) Field of Classification Search ............. 463/16–20, 463/22, 25, 29, 39–43
See application file for complete search history.

(56) References Cited

U.S. PATENT DOCUMENTS

| | | | | |
|---|---|---|---|---|
| 6,023,729 | A | 2/2000 | Samuel et al. | |
| 6,488,585 | B1 | 12/2002 | Wells et al. | |
| 6,638,170 | B1 | 10/2003 | Crumby | |
| 6,645,077 | B2 | 11/2003 | Rowe | |
| 6,881,148 | B2 | 4/2005 | Yotsugi et al. | |
| 7,047,406 | B2 * | 5/2006 | Schleicher et al. | 713/168 |
| 2002/0137217 | A1 | 9/2002 | Rowe | |
| 2002/0138744 | A1 | 9/2002 | Scheicher et al. | |

(Continued)

FOREIGN PATENT DOCUMENTS

WO WO-2007059080 A3 5/2007

OTHER PUBLICATIONS

"International Search Report for Application No. PCT/US2006/44087, date mailed Jan. 4, 2008", 4 pgs.

(Continued)

*Primary Examiner* — Sunit Pandya
(74) *Attorney, Agent, or Firm* — Schwegman, Lundberg & Woessner, P.A.

(57) ABSTRACT

Systems, methods, and apparatus for transmitting content in wagering networks are described herein. In one embodiment, the method includes determining a first source for a first block of a wagering content file. The method can also include determining a second source for a second block of the wagering content file. The method can also include receiving the first block from the first source, receiving the second block from the second source, and using the first block and the second block to create a copy of the wagering content file.

24 Claims, 10 Drawing Sheets

U.S. PATENT DOCUMENTS

| | | | |
|---|---|---|---|
| 2002/0151366 | A1 | 10/2002 | Walker et al. |
| 2002/0152120 | A1 | 10/2002 | Howington |
| 2003/0188306 | A1 | 10/2003 | Harris et al. |
| 2003/0232650 | A1 | 12/2003 | Beatty |
| 2004/0043817 | A1 | 3/2004 | Willis |
| 2004/0044723 | A1 | 3/2004 | Bell |
| 2004/0048668 | A1 | 3/2004 | Brosnan |
| 2004/0048671 | A1 | 3/2004 | Rowe |
| 2004/0083474 | A1 | 4/2004 | McKinlay et al. |
| 2004/0166940 | A1 | 8/2004 | Rothschild |
| 2004/0180721 | A1 | 9/2004 | Rowe |
| 2004/0198496 | A1 | 10/2004 | Gatto et al. |
| 2004/0209690 | A1 | 10/2004 | Bruzzese et al. |
| 2004/0229698 | A1 | 11/2004 | Lind et al. |
| 2004/0248642 | A1 | 12/2004 | Rothschild |
| 2005/0192099 | A1* | 9/2005 | Nguyen et al. .................. 463/42 |
| 2005/0268102 | A1* | 12/2005 | Downey ........................ 713/176 |
| 2005/0282635 | A1 | 12/2005 | Aoki |
| 2006/0183550 | A1 | 8/2006 | Gagner et al. |

OTHER PUBLICATIONS

"Written Opinion of the International Searching Authority for Application No. PCT/US2006/44087, date mailed Jan. 4, 2008", 5 pgs.

"U.S. Appl. No. 11/275,979, Final Office Action mailed Dec. 24, 2009", 11 Pgs.

"U.S. Appl. No. 11/275,979, Non Final Office Action mailed Jun. 1, 2009", 10 pgs.

"U.S. Appl. No. 11/275,979, Response file Sep. 22, 2009 to Non Final Office Action mailed Jun. 1, 2009", 11 pgs.

* cited by examiner

TRANSMITTING CONTENT IN WAGERING NETWORKS

RELATED APPLICATION

This patent application is a U.S. National Stage Filing under 35 U.S.C. 371 from International Patent Application Serial No. PCT/US2006/044087, filed Nov. 13, 2006, and published on May 24, 2007 as WO 2007/059080 A2, which claims the priority benefit of U.S. Provisional Patent Application Ser. No. 60/736,523, filed Nov. 14, 2005 and entitled "TRANSMITTING CONTENT IN WAGERING NETWORKS" by inventor Rory L. Block, the contents of which are incorporated herein by reference in their entirety.

LIMITED COPYRIGHT WAIVER

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever. Copyright 2005, 2006, WMS Gaming, Inc.

FIELD

Embodiments of the invention relate generally to the field of wagering networks and more specifically to the field of wagering game content distribution in wagering networks.

BACKGROUND

Wagering game makers continually provide new and entertaining games. One way of increasing entertainment value associated with casino-style wagering games (e.g., video slots, video poker, video blackjack, and the like) includes offering a variety of base games and bonus events. However, despite the variety of base games and bonus events, players often lose interest in repetitive gaming content. In order to maintain player interest, wagering game machine makers frequently update wagering game machine content with new game themes, game settings, bonus events, game software, and other electronic data.

When deploying new gaming content to wagering game machines in the field, wagering game machine operators typically manually deliver the content to each wagering game machine. For example, when deploying new wagering game content, an operator typically replaces existing media (e.g. ROM, CD-ROM, or flash RAM) with new media containing updated gaming content. For wagering game machine operators owning scores of machines, this process can be relatively laborious and expensive.

SUMMARY

Systems, methods, and apparatus for transmitting content in wagering networks are described herein. In one embodiment, the method includes determining a first source for a first block of a wagering content file. The method can also include determining a second source for a second block of the wagering content file. The method can also include receiving the first block from the first source, receiving the second block from the second source, and using the first block and the second block to create a copy of the wagering content file.

BRIEF DESCRIPTION OF THE FIGURES

The present invention is illustrated by way of example and not limitation in the Figures of the accompanying drawings in which.

DESCRIPTION OF THE EMBODIMENTS

Systems, methods, and apparatus for transmitting content in wagering networks are described herein. This description of the embodiments is divided into four sections. The first section presents an introduction to embodiments of the invention, while the second section describes an example operating environment and system architecture. The third section describes example operations and the fourth section describes example embodiments of a wagering game machine. The fifth section provides some general comments.

Introduction

This section provides an introduction to embodiments of a system for transmitting content in wagering networks. Embodiments of the invention enable wagering game machines and other wagering network devices to download parts of a wagering game file from multiple sources in a wagering network. Because wagering game machines can download a single wagering game file from multiple sources, wagering game machines may be able to access needed content despite certain network connection failures. Additionally, downloading a file from multiple sources can reduce latencies associated with file downloading. The following discussion of FIG. 1 describes these and other features.

Figure 1:
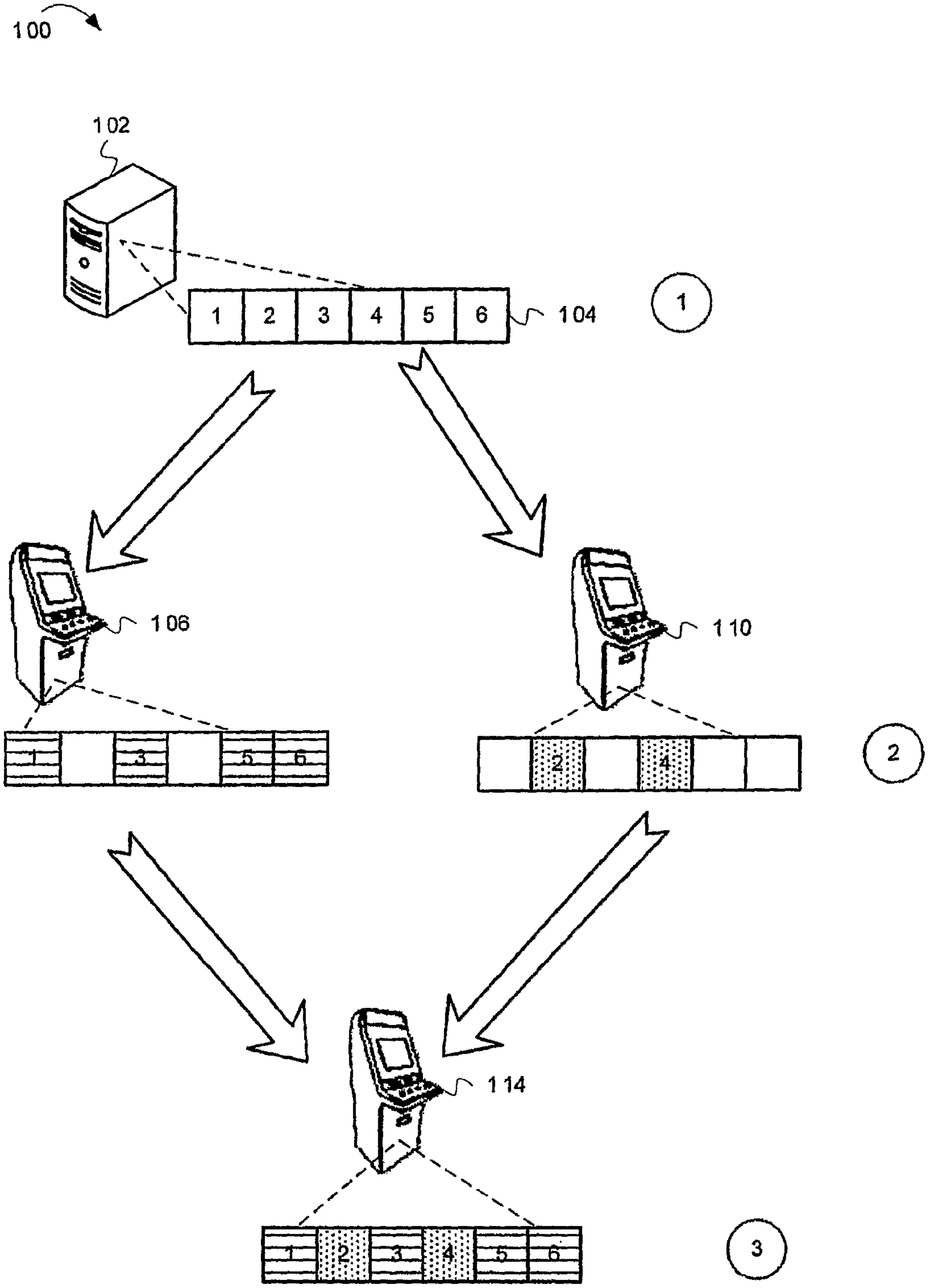
FIG. 1 is a dataflow diagram illustrating how a wagering game machine can download parts of a single wagering game file from multiple sources, according to embodiments of the invention.

FIG. 1 is a dataflow diagram illustrating how a wagering game machine can download parts of a single wagering game file from multiple sources, according to embodiments of the invention. In particular, the dataflow shows how a wagering game machine 114 can download different parts of a wagering content file from two different wagering game machines 106 and 110. The data flow occurs in three main stages.

At stage 1, a wagering network device 102 divides a wagering game file 104 into a plurality of blocks. After dividing the file, the wagering network device 102 can simultaneously (or sequentially) transmit copies of the blocks to wagering game machines in the wagering network 100.

At stage two, wagering game machines 106 and 110 each receive from the wagering network device 102 different blocks of the wagering game file 104. In particular, the wagering game machine 106 receives blocks 1, 3, 5, and 6, whereas the wagering game machine 110 receives blocks 2 and 4. After receiving blocks from the wagering network device 102, the wagering game machines 106 and 110 can transmit their blocks to other wagering game machines in the wagering network 100.

A stage three, wagering game machine 114 receives blocks 1, 3, 5, and 6 from the wagering game machine 106, and it also receives blocks 2 and 4 from the wagering game machine 110. In one embodiment, the wagering game machines can receive blocks (or parts of blocks) from multiple sources at the same time. Thus, the wagering game machine 114 can simultaneously receive blocks from the wagering game machines 106 and 110. After receiving all blocks of the wagering content file 104, the wagering game machine 114 creates a copy of the wagering game file 104 by integrating the blocks 1-6.

Hardware, Operating Environment, and System Architecture

Figure 2:
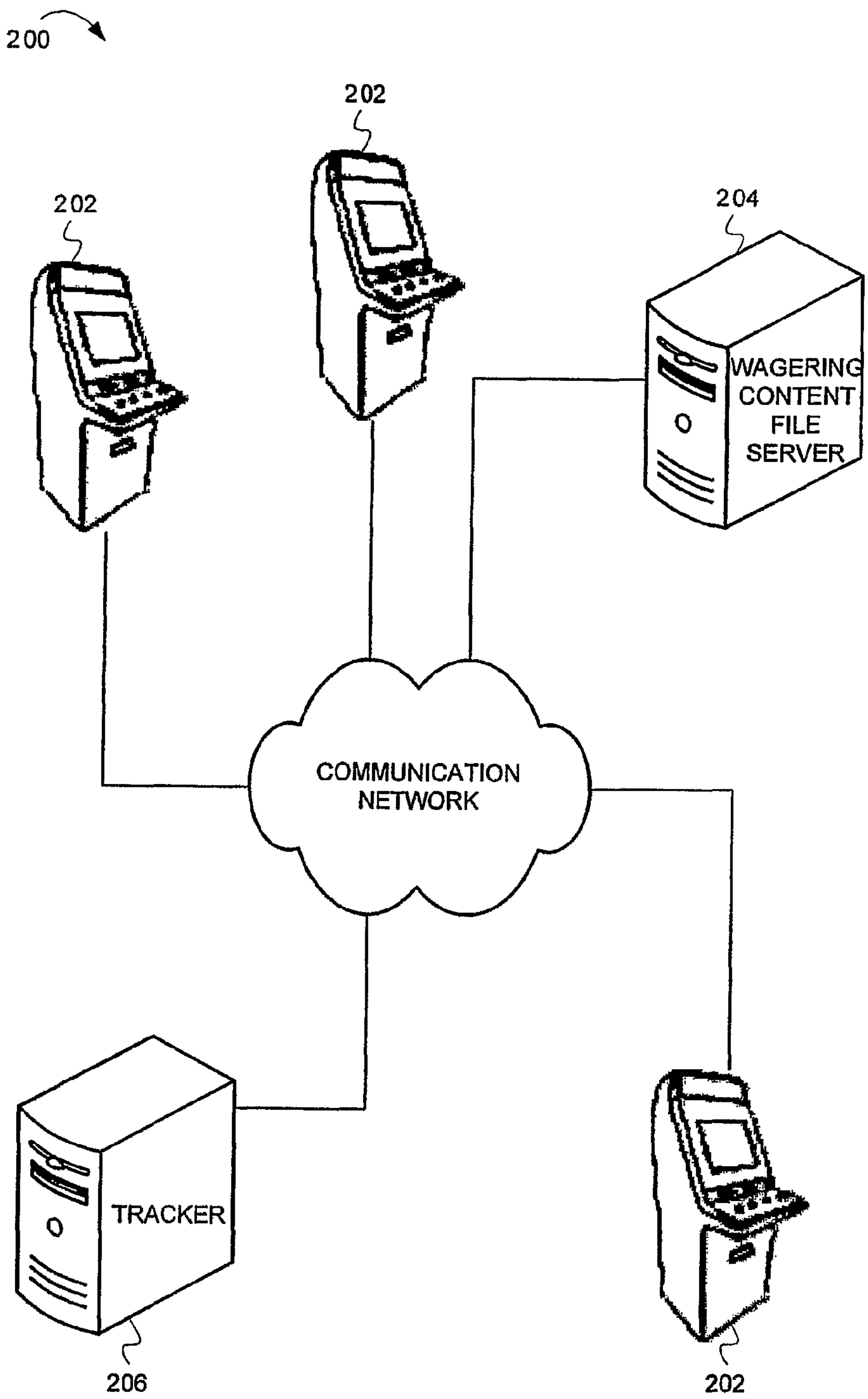
FIG. 2 is a block diagram illustrating a wagering network, according to example embodiments of the invention.
Figure 3:
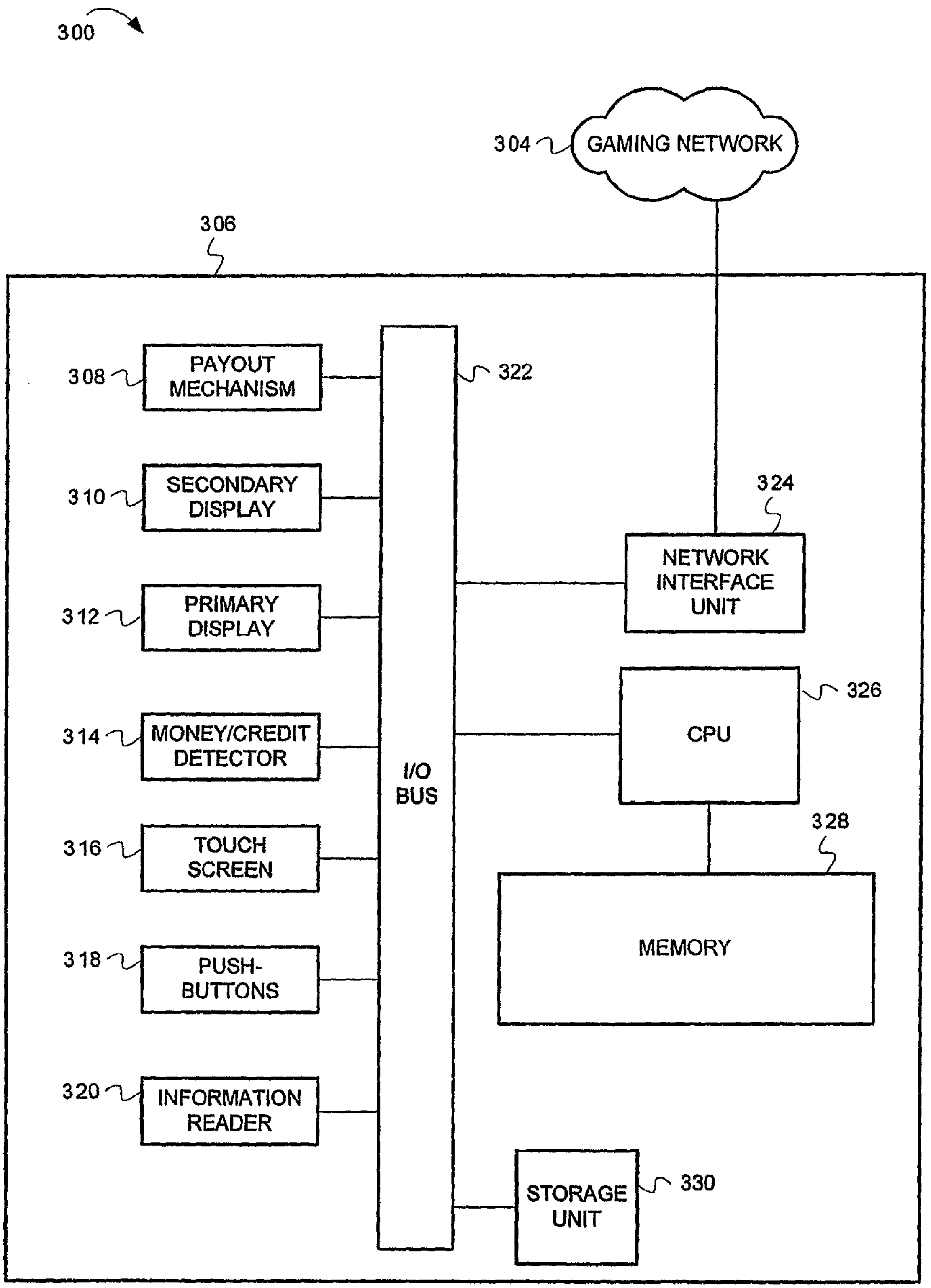
FIG. 3 is a block diagram illustrating a wagering network device, according to example embodiments of the invention.

This section describes some example hardware and an operating environment in which embodiments of the invention can be practiced. FIG. 2 presents an example wagering network, while FIG. 3 presents an example wagering network device architecture. Example operations of the wagering network device will be described in the next section.

Example Wagering Network

FIG. 2 is a block diagram illustrating a wagering network, according to example embodiments of the invention. As shown in FIG. 2, a wagering network 200 includes a communication network 210 connected to wagering game machines 202, a wagering content tracker 206, and a wagering content file server 204.

The communications network 210 can include any suitable technology for connecting the wagering network's components. For example, the communications network 210 can include Ethernet connectivity, 802.11 connectivity, public switched telephone networks, DSL networks, Fiber connectivity, etc.

The wagering content file server 208 can include logic for dividing wagering content files into blocks and transmitting the blocks for receipt by wagering game machines 202, which in turn, can transmit the blocks to other wagering game machines 202. The wagering content file server 208 can be a minicomputer, microcomputer (e.g., laptop or desktop computer), mainframe computer, or any other computing device suitable for storing and transmitting wagering content files over wagering networks.

The wagering content files can include any suitable information for use by the wagering game machines 202 or other wagering network devices (e.g., wagering network game servers, wagering network configuration servers, etc.). For example, the wagering content files can include instructions and/or data for conducting casino style wagering games (e.g., video slots, video poker, video blackjack, and the like). In one embodiment, the wagering content files can include program code, audio content, video content, and/or other data used for conducting all or part of a casino style slots game and/or bonus events. The wagering content files can also include executable game code, game math, art, configuration data (e.g., enumerating allowable percentages, denominations, paylines, etc.), operating system features, peripheral device drivers or other peripheral device code/content, attract mode displays, advertisements, and episodic game content. In one embodiment, the wagering content files include configuration parameters for configuring wagering network devices.

The wagering content tracker 206 can keep track of where blocks associated with a wagering content file are available for download. For example, the wagering content tracker 206 can maintain a list indicating that a particular block is available for download from one of the wagering game machines 202. In one embodiment, wagering network devices query the wagering content tracker 206 to determine where they can download needed blocks. In one embodiment, the wagering network 200 does not include a wagering content tracker 206.

Example Gaming Device Architecture

FIG. 3 is a block diagram illustrating a wagering network device, according to example embodiments of the invention. According to embodiments, the wagering network device 306 can operate as a wagering game machine, wagering game server, wagering content file server, wagering content tracker, and/or other suitable devices in a wagering network.

As shown in FIG. 3, the wagering network device 306 includes a central processing unit (CPU) 326 connected to a memory unit 328. In one embodiment, the memory unit 328 includes a wagering game unit 332, which can conduct any suitable casino-style wagering game, such as video poker, video blackjack, video slots, video lottery, etc. Alternatively, the memory unit can include instructions for performing other suitable wagering network operations.

The CPU 326 is also connected to an input/output (I/O) bus 322, which facilitates communication between the wagering game device's components. The I/O bus 322 is connected to a payout mechanism 308, secondary display 310, primary display 312, money/credit detector 314, touchscreen 316, post-buttons 318, and information reader 320. The I/O bus 322 is also connected to the storage unit 330 and network interface unit 324, which is connected to a wagering network 304.

In one embodiment, the wagering network device 306 can include additional peripheral devices and/or more than one of each component shown in FIG. 3. For example, in one embodiment, the wagering network device 306 can include multiple network interface units 324 and multiple CPUs 326. In one embodiment, any of the components can be further integrated or subdivided. Additionally, in one embodiment, the components of the wagering game machine 306 can be interconnected according to any suitable interconnection architecture (e.g., directly connected, hypercube, etc.).

In one embodiment, any of the components of the wagering network device 306 can include machine-readable media including instructions for performing operations described herein. Machine-readable media includes any mechanism that provides (i.e., stores and/or transmits) information in a form readable by a machine (e.g., a computer). For example, tangible machine-readable media includes read only memory (ROM), random access memory (RAM), magnetic disk storage media, optical storage media, flash memory devices, etc. Furthermore, components of the wagering network device 306 can include other types of logic (e.g., digital logic) for executing the operations described herein.

Example Operations

This section describes operations performed by embodiments of the invention. In certain embodiments, the operations are performed by instructions residing on machine-readable media (e.g., software), while in other embodiments, the methods are performed by hardware or other logic (e.g., digital logic). The following discussion of example operations will make reference to the example embodiments discussed above.

In this section, FIGS. 4-10 will be discussed. In particular, FIGS. 4-6 describe a first technique for distributing wagering content files throughout a wagering network, whereas FIG. 7-10 describe the second technique for distributing wagering content files.

Content Distribution Using Wagering Content Trackers

In one embodiment, a system for distributing wagering content files calls for a wagering network including a wagering content file server, wagering content tracker, and wagering game machine. In one embodiment, the wagering content file server, wagering content tracker, and wagering game machine work together to enable wagering network devices to download a wagering content file from multiple sources. Example operations for each of these devices are described in FIGS. 4-6.

Figure 4:
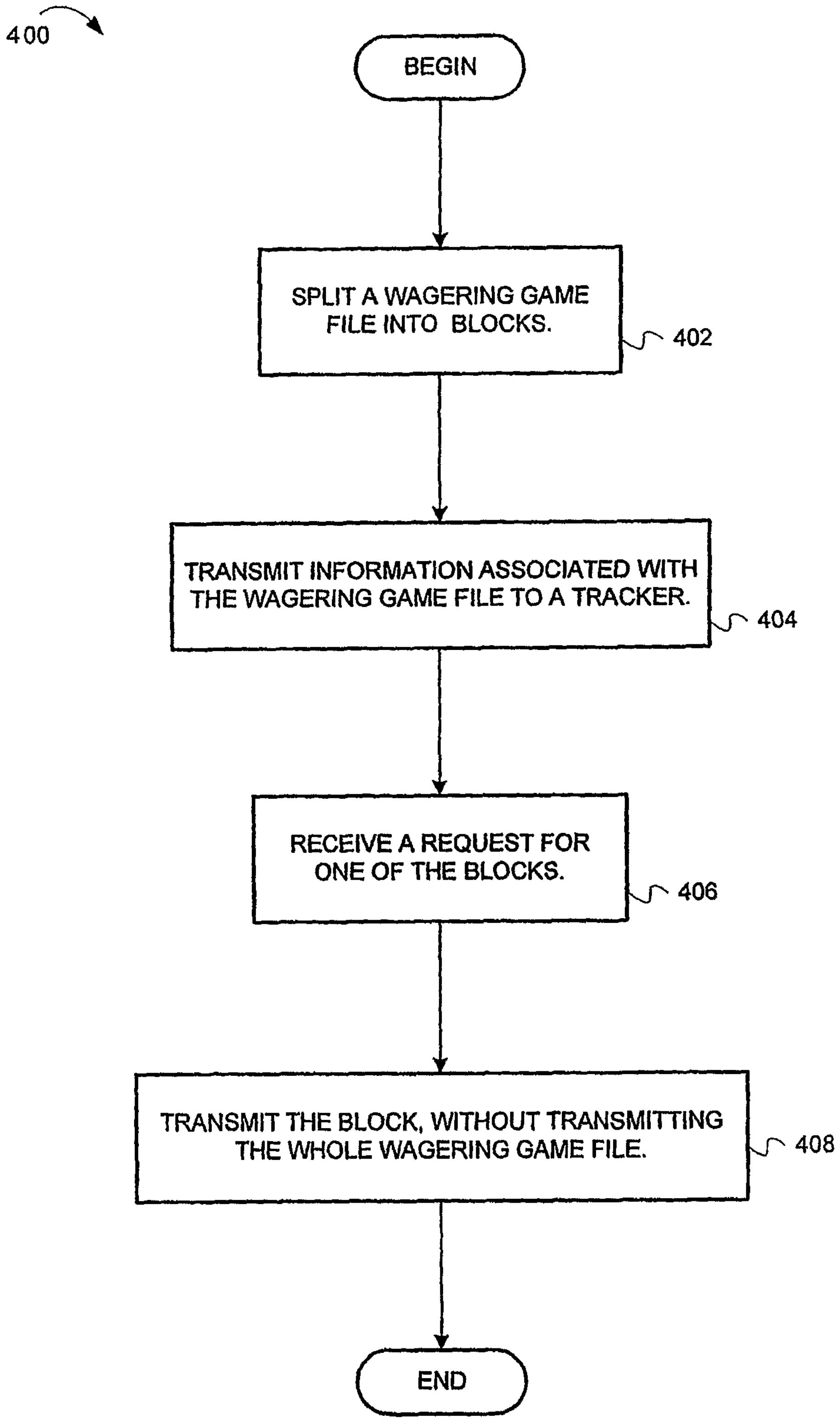
FIG. 4 is a flow diagram illustrating file sharing operations performed by a wagering content file server, according to example embodiments of the invention.

FIG. 4 is a flow diagram illustrating file sharing operations performed by a wagering content file server, according to example embodiments of the invention. The flow 400 begins at block 402.

At block 402, the wagering content file server 204 splits a wagering content file into a plurality of blocks. In one embodiment, each block includes 256 kB of the original wagering content file. Alternatively, each block can be any suitable size, such as 128 kB, 512 kB, 1 Mb, etc. The flow continues at block 404.

At block 404, the wagering content file server 204 transmits information associated with the wagering game file to a wagering content tracker 206. In one embodiment, the information can include a file identifier and port number. In one embodiment, the wagering content tracker 206 keeps track of which devices are storing blocks of the original wagering content file, as described in more detail below (see discussion of FIG. 5). The flow continues at block 406.

At block 406, the wagering content file server 204 receives a request for one of the blocks of the wagering content file. In one embodiment, the request can originate from any device on the wagering network 200 (e.g., one of the wagering game machines 202). In one embodiment, the wagering content file server 204 can receive multiple requests from multiple devices, wherein the requests are received simultaneously or very close time. The flow continues at block 408.

At block 408, the wagering content file server 204 transmits the requested block, without transmitting the entire wagering content file. In one embodiment, the wagering content file server 204 can transmit more than one requested block, where the transmissions are simultaneous or very close time. From block 408, the flow ends.

Figure 5:
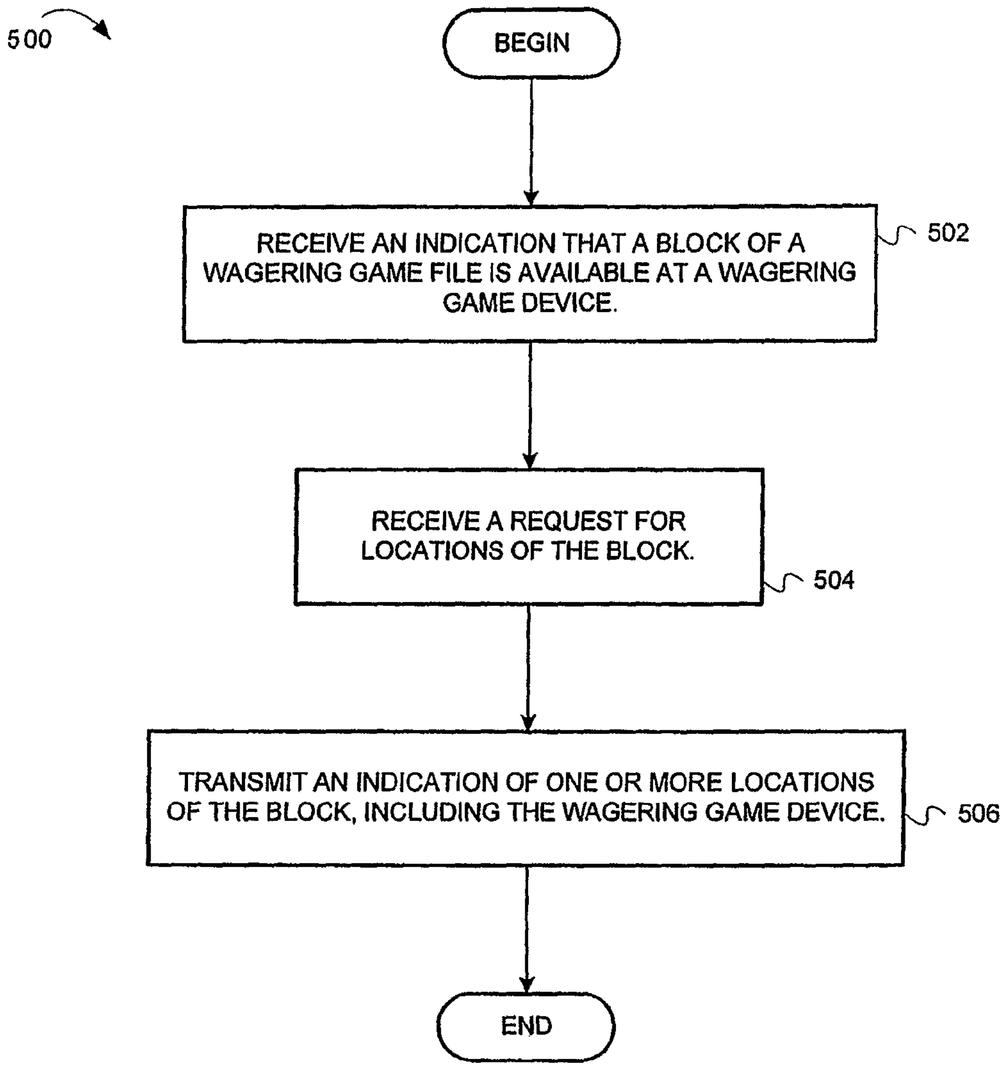
FIG. 5 is a flow diagram illustrating file sharing operations performed by a wagering content file tracker, according to example embodiments of the invention.

While FIG. 4 describes operations performed by embodiments of a wagering content file server, FIG. 5 describes example operations performed by embodiments of a wagering content tracker. This description continues with the discussion of FIG. 5.

FIG. 5 is a flow diagram illustrating file sharing operations performed by a wagering content tracker, according to example embodiments of the invention. In one embodiment, the wagering network 200 can include one or more wagering content trackers 206, each performing the operations described below. The flow diagram 500 begins at block 502.

At block 502, the wagering content tracker 206 receives an indication that a block of a wagering content file is available at a wagering network device. For example, the wagering content tracker 206 can receive an indication that a block is available at the wagering content file server 204. Alternatively, the wagering content file may be available at another wagering network device, such as a wagering game machine 202. The flow continues at block 504.

At block 504, the wagering content tracker 206 receives a request for sources of the block. The request can originate from any wagering network device that needs a block. In one embodiment, the wagering content tracker 206 can receive multiple requests simultaneously or very close time. The flow continues at block 506.

At block 506, the wagering content tracker 206 transmits an indication of one or more sources from which the block can be downloaded. In one embodiment, the locations can include wagering game machines 202 or any other gaming network device. In one embodiment, the wagering content tracker 206 transmits multiple indications simultaneously or very close in time. From block 506, the flow ends.

Figure 6:
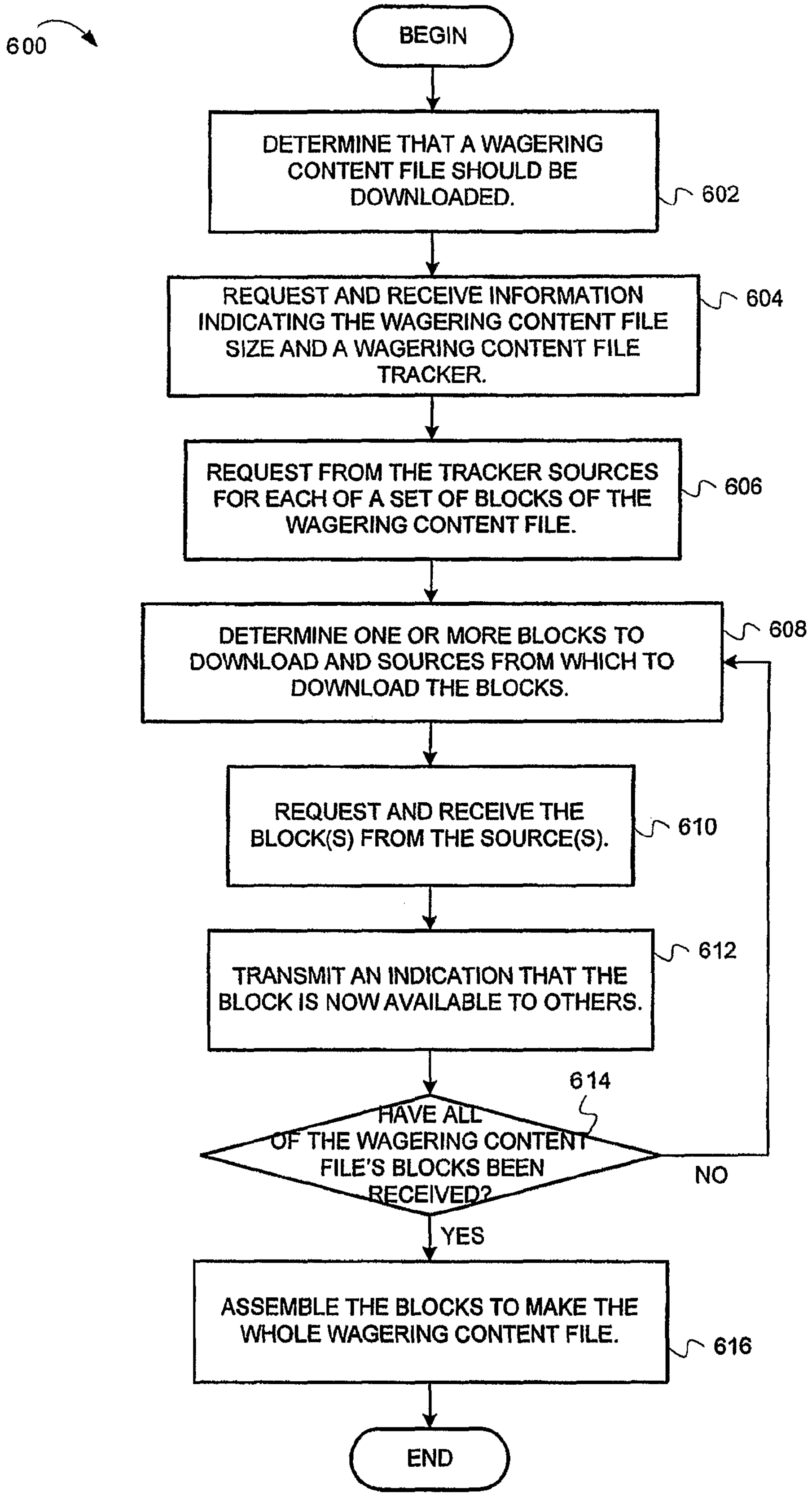
FIG. 6 is a flow diagram illustrating operations for downloading blocks of a wagering content file from one or more sources in a wagering network, according to example embodiments of the invention.

This description continues with FIG. 6, which describes operations for downloading blocks from one or more sources.

FIG. 6 is a flow diagram illustrating operations for downloading blocks of a wagering content file from one or more sources in a wagering network, according to example embodiments of the invention. In one embodiment, any wagering network device needing a wagering content file block can perform the operations of the flow diagram 600. The flow diagram 600 commences at block 602.

At block 602, a wagering game device 202 determines that a wagering content file should be downloaded. For example, the wagering game device 202 may determine that it needs a new wagering game content file, such as bonus event audio file. The flow continues at block 604.

At block 604, the wagering game machine 202 requests and receives information indicating the wagering content file's size and an associated wagering content tracker. In one embodiment, the wagering game machine 202 requests and receives this information from a web site (not shown in FIG. 2) or other wagering network device. The flow continues at block 606.

At block 606, the wagering game machine 202 requests from the wagering game content tracker 206 sources for each block of the needed wagering content file. In one embodiment, the sources are network devices that have copies of the needed blocks. The flow continues at block 608.

At block 608, the wagering game machine 202 determines one or more blocks to download and sources (i.e., a wagering network device) from which to download the blocks. In one embodiment, the wagering game machine 202 can use any suitable algorithm for determining which block(s) to download. For example, the wagering a machine 202 can employ any one of the following algorithms: strict priority, rarest first, random first, and end game mode. According to the strict priority algorithm, a wagering network device assigns a priority to each block of the file and it downloads the high priority blocks first. According to rarest first, a wagering network device determines which of the file's blocks is rarest and it downloads the rarest block first. According to random first, a wagering network device chooses blocks at random. According to the end game mode, a wagering network device selects a block and requests the block from all wagering network devices on which it is available. The flow continues at block 610.

At block 610, the wagering game machine 202 requests and receives the one or more blocks from the sources. For example, the wagering game machine 202 requests and receives one or more blocks from one or more other wagering game machines 202. In one embodiment, the wagering game machine can simultaneously receive a plurality of blocks from a plurality of sources. In some wagering networks, when a wagering network device simultaneously (or almost simultaneously) receives multiple blocks from multiple sources, downloading latencies may be less than when blocks are received sequentially from a single source. The flow continues at block 612.

At block 612, the wagering game machine 202 transmits to the wagering content tracker 206 an indication that the wagering game machine 202 is a source from which other wagering network devices can download the block. The flow continues at block 614.

At block 614, the wagering game machine 202 determines whether it has received all blocks of the needed wagering content file. If the wagering a machine 202 has received all blocks of the needed which are content file, the flow continues at block 616. Otherwise, the flow continues at block 608.

At block 616, the wagering game machine 202 integrates the blocks, forming a copy of the entire wagering game file. From block 616, the flow ends.

Trackerless Content Distribution

This description continues with the discussion of a second technique for distributing wagering content files in a wagering network. According to the second technique, wagering network devices can download file blocks from multiple sources without a mechanism for tracking where available blocks are stored (i.e., without a wagering content tracker). Embodiments employ network coding to eliminate the need for a central block tracking mechanism. In one embodiment, wagering network devices create blocks by making encoded combinations of blocks they have. For example, if a wagering game device has two blocks of a particular wagering game file, it creates a block for upload by making a linearly independent encoding of its two blocks. The discussion of FIG. 7 describes this in greater detail.

Figure 7:
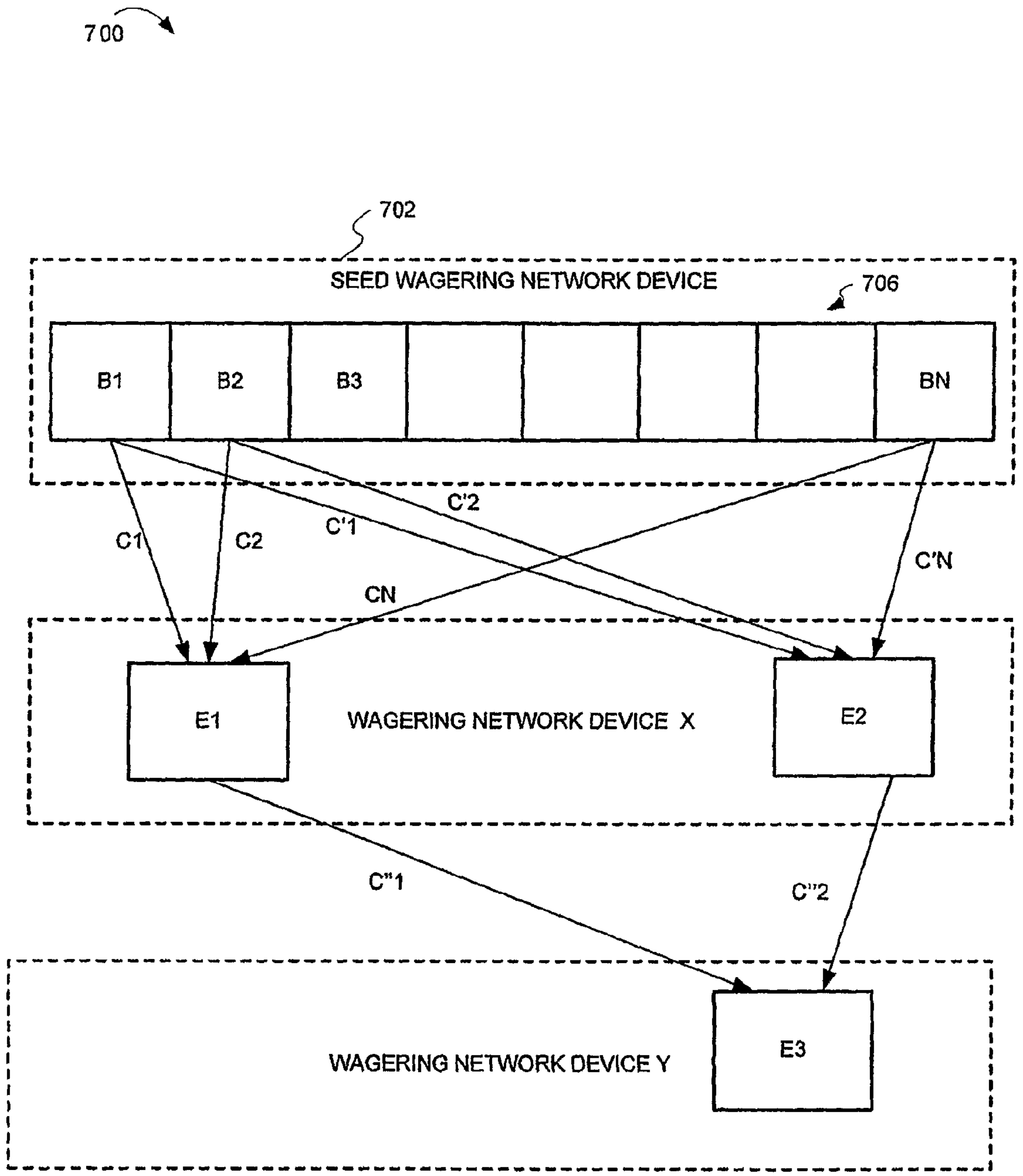
FIG. 7 is a diagram illustrating a technique for encoding a wagering content file, according to example embodiments of the invention.

FIG. 7 is a diagram illustrating a technique for encoding and distributing blocks of a wagering content file, according to example embodiments of the invention. As shown in FIG. 7, a seed wagering network device 702 divides a wagering game content file 706 into a number of blocks B1-BN. The seed wagering network device 702 creates an upload block E1 by multiplying the blocks B1-BN by a set of random coefficients C1-CN. The seed wagering network device 702 uploads to the wagering network device X both block E1 and the set of random coefficients C1-CN. In FIG. 7, the seed wagering network device 702 similarly creates block E2 and uploads it and another set of random coefficients C'1-C'N to the wagering network device X.

As shown FIG. 7, the wagering network device X creates an upload block based on blocks E1 and E2. The wagering network device X creates an upload block E3 by 1) selecting a random set of coefficients C"1 and C"2; 2) multiplying each element of block E1 by C"1 and each element of E2 by C"2; and 3) summing the results of the multiplications. The wagering network device X uploads the block E3 and coefficients C"1 and C"2 to a wagering network device Y. Because the wagering content file was initially divided into N blocks, the wagering network devices X and Y can download and reconstruct the wagering content file 704 after receiving N blocks from any network device. Techniques for encoding blocks are described in greater detail in "Network Coding for Large-Scale Content Distribution," by Christos Gkantsidis and Pablo Rodriguez Rodriguez (IEEE Infocom 2005).

Figure 8:
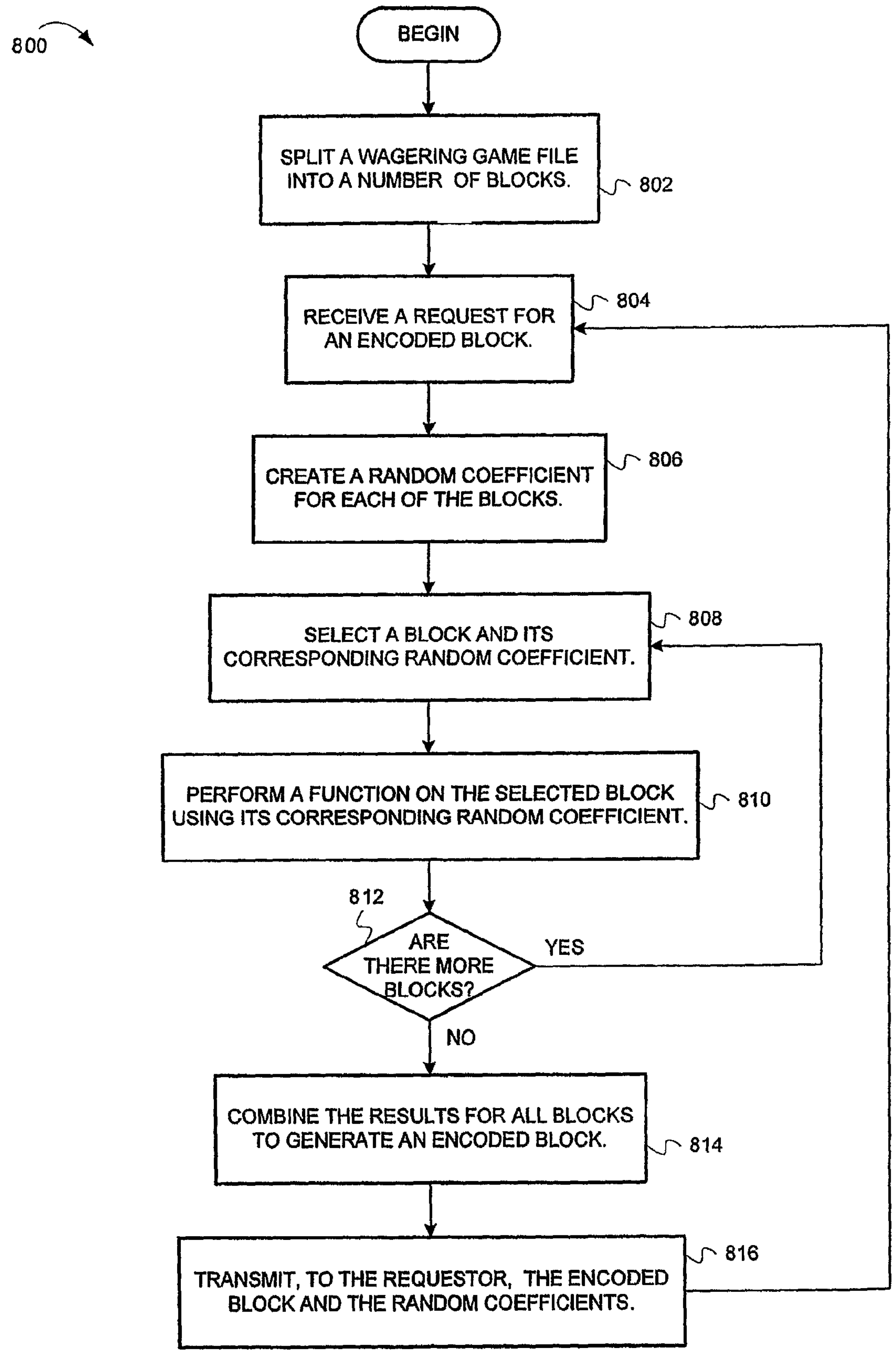
FIG. 8 is a flow diagram illustrating operations for encoding and distributing blocks of a wagering content file.
Figure 9:
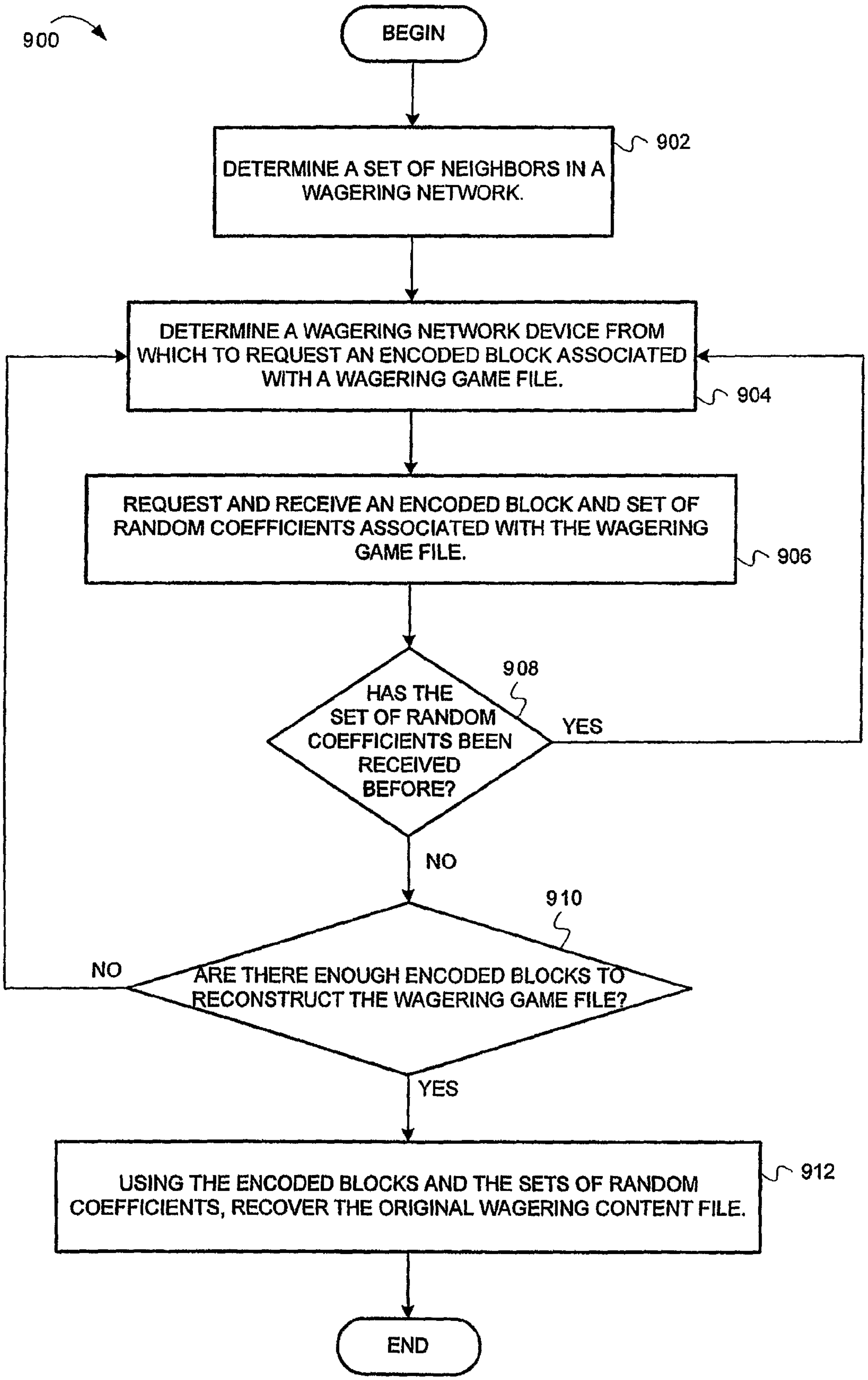
FIG. 9 is a flow diagram illustrating operations for reconstructing a wagering content file based on blocks received from multiple sources, according to example embodiments of the invention.

This section continues with the discussion of FIGS. 8 and 9, which describe operations for distributing encoded gaming content file blocks without needing a mechanism for tracking available blocks. FIG. 8 will be described next.

FIG. 8 is a flow diagram illustrating operations for encoding and distributing blocks of a wagering content file, according to example embodiments of the invention. The flow 800 begins at block 802.

At block 802, a seed device, such as a wagering game machine 202, splits the wagering content file into a number of blocks. The flow continues at block 804.

At block 804, the wagering game machine 202 receives a request for an encoded block. The flow continues at block 806.

At block 806, the wagering game machine 202 creates a random coefficient for each of the blocks. The flow continues at block 808.

At block 808, wagering a machine 202 selects a block and the block's corresponding random coefficient. The flow continues at block 810.

At block 810, the wagering game machine 202 applies the random coefficient to the block. In one embodiment, the wagering game machine 202 multiplies each element of the block by the random coefficient and adds the results of the multiplication together. The flow continues at block 812.

At block 812, the wagering game machine 202 determines whether all the blocks have been operated upon. If there are more blocks, the flow continues at block 808. Otherwise, the flow continues at block 814.

At block 814, the wagering game machine 202 adds the results for all the blocks together, forming an encoded block. The flow continues at block 816.

At block 816, the wagering game machine 202 transmits the encoded block and the random coefficients to the requester. From block 816, the flow ends.

While FIG. 8 describes operations for encoding and transmitting blocks of the wagering content file, FIG. 9 describes operations for receiving blocks of reconstructing the wagering content file. This description continues with FIG. 9.

FIG. 9 is a flow diagram illustrating operations for reconstructing a wagering content file based on blocks received from multiple sources, according to example embodiments of the invention. The flow 900 begins at block 902.

At block 902, a wagering network device, such as a wagering game machine 202, determines a set of neighbors in the wagering network. In one embodiment, the wagering, game machine 202 determines its neighbors (i.e., network devices which are one hop away) by asking a network topology server (not shown). In another embodiment, the wagering game machine determines its neighbors by sending and receiving a series of network messages. The flow continues at block 904.

At block 904, the wagering game machine 202 determines a wagering network device (i.e., a neighbor) from which to request an encoded block of a wagering game file. The flow continues at block 906.

At block 906, the wagering game machine 202 requests and receives an encoded block and set of random coefficients, both of which are associated with the wagering game file. The flow continues at block 908.

At block 908, the wagering game machine 202 determines whether set of random coefficients match a set it has already received. If the wagering game machine has not already received a random set of coefficients, the flow continues at block 910. Otherwise, the flow continues at block 904.

At block 910, the wagering game machine 202 determines whether there are enough encoded blocks to reconstruct the wagering game file. In one embodiment, a wagering game file can be reconstructed from some predetermined number of blocks. For example, if the wagering game content file was originally divided into 10 blocks, then 10 blocks are needed to reconstruct the file. If there are not enough blocks, the flow continues at block 904. Otherwise, the flow continues at block 912.

At block 912, the wagering game machine 202 uses the encoded blocks and the random coefficients to rebuild the original wagering content file. From block 912, the flow ends.

Example Wagering Game Machine

Figure 10:
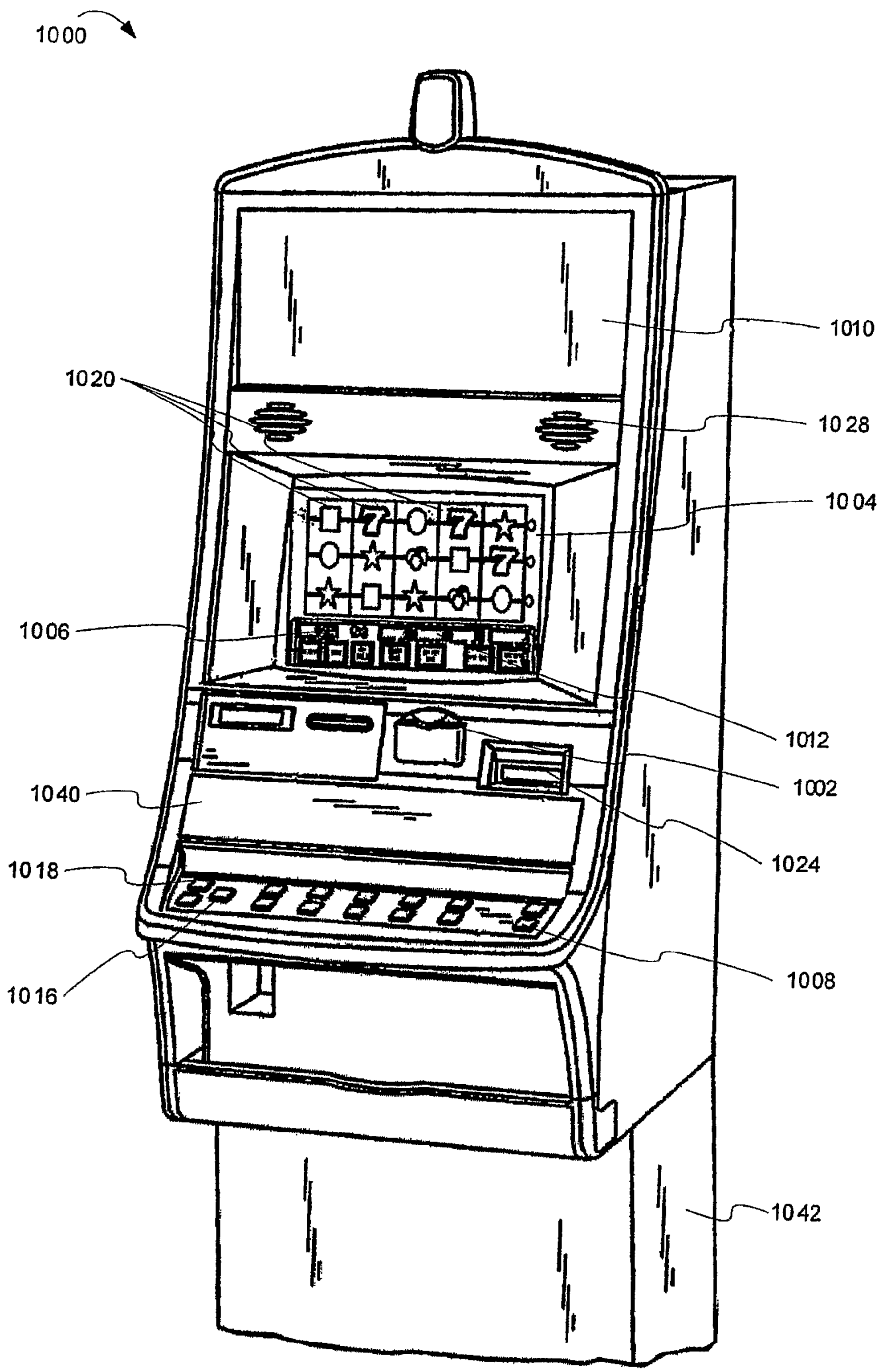
FIG. 10 is a perspective view of a wagering game machine, according to example embodiments of the invention.

FIG. 10 is a perspective view of a wagering game machine, according to example embodiments of the invention. As shown in FIG. 10, the wagering game machine 1000 can be a computerized slot machine having the controls, displays, and features of a conventional slot machine.

The wagering game machine 1000 can be mounted on a stand 1042 or it can be constructed as a pub-style tabletop game (not shown). As a result, the wagering game machine 1000 can be operated while players are standing or seated. Furthermore, the wagering game machine 1000 can be constructed with varying cabinet and display designs. The wagering game machine 1000 can incorporate any primary game such as slots, poker, or keno, and additional bonus round games. The symbols and indicia used on and in the wagering game machine 1000 can take mechanical, electrical, or video form.

As illustrated in FIG. 10, the wagering game machine 1000 includes a coin slot 1002 and bill acceptor 1024. Players can place coins in the coin slot 1002 and paper money or ticket vouchers in the bill acceptor 1024. Other devices can be used for accepting payment. For example, credit/debit card readers/validators can be used for accepting payment. Additionally, the wagering game machine 1000 can perform electronic finds transfers and financial transfers to procure monies from financial accounts. When a player inserts money in the wagering game machine 1000, a number of credits corresponding to the amount deposited are shown in a credit display 1006. After depositing the appropriate amount of money, a player can begin playing the game by pushing play button 1008. The play button 1008 can be any play activator used for starting a wagering game or sequence of events in the wagering game machine 1000.

As shown in FIG. 10, the wagering game machine 1000 also includes a bet display 1012 and one or more "bet" buttons on the panel 1016. The player can place a bet by pushing one or more of the bet buttons on the panel 1016. The player can increase the bet by one or more credits each time the player pushes a bet button. When the player pushes a "bet one" button 1016, the number of credits shown in the credit display 1006 decreases by one credit, while the number of credits shown in the bet display 1012 increases by one credit.

A player may end the gaming session or "cash-out" by pressing a cash-out button 1018. When a player cashes-out, the wagering game machine 1000 dispenses a voucher or currency corresponding to the number of remaining credits. The wagering game machine 1000 may employ other payout mechanisms such as credit slips (which are redeemable by a cashier) or electronically recordable cards (which track player credits), or electronic funds transfer.

The wagering game machine also includes a primary display unit 1004 and a secondary display unit 1010 (also known as a "top box"). The wagering game machine may also include an auxiliary video display 1040. In one embodiment, the primary display unit 1004 displays a plurality of video reels 1020. According to embodiments of the invention, the display units 1004 and 1010 can include any visual representation or exhibition, including moving physical objects (e.g., mechanical reels and wheels), dynamic lighting, and video images. In one embodiment, each reel 1020 includes a plurality of symbols such as bells, hearts, fruits, numbers, letters, bars or other images, which correspond to a theme associated with the wagering game machine 1000. Additionally, the wagering game machine 1000 also includes an audio presentation unit 1028. The audio presentation unit 1028 can include audio speakers or other suitable sound projection devices.

In one embodiment, the wagering game machine 1000 can simultaneously (or serially) download parts of a wagering content file from multiple wagering network devices, as described herein.

General

In this description, numerous specific details are set forth. However, it is understood that embodiments of the invention may be practiced without these specific details. In other instances, well-known circuits, structures and techniques have not been shown in detail in order not to obscure the understanding of this description. Note that in this description, references to "one embodiment" or "an embodiment" means that the feature being referred to is included in at least one embodiment of the invention. Further, separate references to "one embodiment" in this description do not necessarily refer to the same embodiment; however, neither are such embodiments mutually exclusive, unless so stated and except as will be readily apparent to those of ordinary skill in the art. Thus, the present invention can include any variety of combinations and/or integrations of the embodiments described herein. Each claim, as may be amended, constitutes an embodiment of the invention, incorporated by reference into the detailed description. Moreover, in this description, the phrase "exemplary embodiment" means that the embodiment being referred to serves as an example or illustration.

Herein, block diagrams illustrate exemplary embodiments of the invention. Also herein, flow diagrams illustrate operations of the exemplary embodiments of the invention. The operations of the flow diagrams are described with reference to the exemplary embodiments shown in the block diagrams. However, it should be understood that the operations of the flow diagrams could be performed by embodiments of the invention other than those discussed with reference to the block diagrams, and embodiments discussed with references to the block diagrams could perform operations different than those discussed with reference to the flow diagrams. Additionally, some embodiments may not perform all the operations shown in a flow diagram. Moreover, it should be understood that although the flow diagrams depict serial operations, certain embodiments could perform certain of those operations in parallel.

The invention claimed is:

1. A method of downloading a wagering content file, comprising:

determining, within a wagering game machine, first block sources for a first block of the wagering content file, wherein the first block is encoded;

determining, within a wagering game machine, second block sources for a second block of the wagering content file, wherein the second block is encoded;

selecting, within a wagering game machine, a first source from the first block sources, wherein selecting includes choosing the first source using a policy selected from the group consisting of strict priority, rarest first, and random piece first;

selecting, within a wagering game machine, a second source from the second block sources, wherein selecting includes choosing the second source using a policy selected from the group consisting of strict priority, rarest first, and random piece first;

receiving the encoded first block from the first source, wherein receiving the encoded first block from the first source includes receiving the encoded first block and a first set of random coefficients associated with the encoded first block from the first source;

receiving the second block from the second source, wherein receiving the encoded second block from the second source includes receiving the encoded second block and a second set of random coefficients associated with the encoded second block from the second source; and creating a copy of the wagering content file as a function of the first block and the second block.

2. The method of claim 1, wherein the first source and the second source are wagering network devices.

3. The method of claim 1, wherein the determining of the first source and the second source includes requesting, from a wagering content tracker, sources of the first block and the second block.

4. The method of claim 3, further comprising:

transmitting an indication to the wagering content tracker that the first block and the second block are available for upload; and uploading the one or more of the blocks to another wagering network device.

5. The method of claim 1, wherein the receiving of the first block and the second block occurs simultaneously.

6. The method of claim 1, wherein the receiving of the first block and the second block occurs sequentially.

7. The method according to claim 1, wherein creating a copy of the wagering content file as a function of the first block and the second block includes using the first encoded block, the second encoded block, the first set of random coefficients, and the second set of random coefficients to create a copy of the wagering content file.

8. The method of claim 7, further comprising:

determining whether the first set of random coefficients or the second set of random coefficients matches a set already received.

9. The method of claim 7, wherein the first source and the second source are neighboring wagering network devices.

10. The method of claim 9, wherein the neighboring wagering network devices are one of a plurality of wagering game machines on a wagering network.

11. The method of claim 9, wherein the neighboring wagering network devices are determined by either asking a network topology server, or sending and receiving a series of network messages.

12. The method of claim 7, wherein each of the first encoded block and the second enclosed block are created with linearly independent encoding.

13. A wagering game machine, comprising:

a central processing unit configured to perform operations defined by instructions;

a memory unit configured to store the instructions, wherein the instructions define operations to cause the central processing unit to determine sources for each of a plurality of encoded blocks of a wagering content file, to download the encoded blocks from the sources, wherein two or more of the sources are different, and to determine that the blocks of the wagering content file have been received;

wherein the operations to determine the sources for each of the plurality of blocks include operations to request, from a wagering content tracker, locations of each of the blocks of the wagering content file, the operations also to determine the best location if there is more than one location for any of the blocks and wherein the operations to download the encoded blocks from the resources include operations to download random coefficients associated with the encoded blocks.

14. The wagering game machine of claim 13, wherein the best location is determined using a policy selected from the group consisting of strict priority, rarest first, random piece first, and endgame mode.

15. The wagering game machine of claim 13, the operations to further cause the central processing unit to transmit an indication to a wagering content tracker that one or more of the plurality of blocks are available for upload, and to upload the one or more of the blocks to another wagering game machine.

16. The wagering game machine of claim 13, wherein the operations to determine that the blocks of the wagering content file have been received include operations to create a copy of the wagering content file as a function of the encoded blocks and of random coefficients associated with the encoded blocks.

17. A method of downloading a wagering content file, comprising:

determining, within a wagering game machine, first block sources for a first block of the wagering content file, wherein the first block is encoded;

determining, within a wagering game machine, second block sources for a second block of the wagering content file, wherein the second block is encoded;

selecting, within a wagering game machine, a first source from the first block sources;

selecting, within a wagering game machine, a second source from the second block sources;

receiving the encoded first block from the first source, wherein receiving the encoded first block from the first source includes receiving the encoded first block and a first set of random coefficients associated with the encoded first block from the first source;

receiving the second block from the second source, wherein receiving the encoded second block from the second source includes receiving the encoded second block and a second set of random coefficients associated with the encoded second block from the second source; and creating a copy of the wagering content file as a function of the first block and the second block.

18. The method according to claim 17, wherein creating a copy of the wagering content file as a function of the first block and the second block includes using the first encoded block, the second encoded block, the first set of random coefficients, and the second set of random coefficients to create a copy of the wagering content file.

19. The method of claim 18, further comprising:

determining whether the first set of random coefficients or the second set of random coefficients matches a set already received.

20. The method of claim 17, wherein determining first block sources and second block sources includes requesting, from a wagering content tracker, sources of the first block and of the second block.

21. The method of claim 20, further comprising:

transmitting an indication to the wagering content tracker that the first block and the second block are available for upload; and uploading the one or more of the blocks to another wagering network device.

22. The method of claim 17, wherein the first source and the second source are neighboring wagering network devices.

23. The method of claim 22, wherein the neighboring wagering network devices are one of a plurality of wagering game machines on a wagering network.

24. The method of claim 22, wherein the neighboring wagering network devices are determined by either asking a network topology server, or sending and receiving a series of network messages.

* * * * *

UNITED STATES PATENT AND TRADEMARK OFFICE

CERTIFICATE OF CORRECTION

PATENT NO. : 8,235,822 B2
APPLICATION NO. : 12/093149
DATED : August 7, 2012
INVENTOR(S) : Rory L. Block It is certified that error appears in the above-identified patent and that said Letters Patent is hereby corrected as shown below:

IN THE SPECIFICATIONS:

In column 8, line 58, delete “wagering, game” and insert --wagering game--, therefor In column 9, line 48, delete “finds” and insert --funds--, therefor Signed and Sealed this
Eleventh Day of December, 2012

David J. Kappos
*Director of the United States Patent and Trademark Office*